(No Model.)
F. P. JOHNSON.
NUT AND BOLT LOCK.
No. 521,470. Patented June 19, 1894.
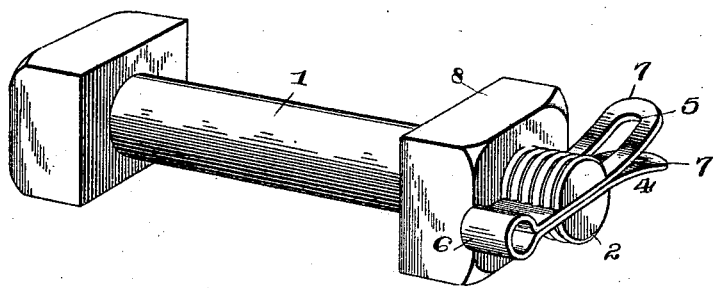
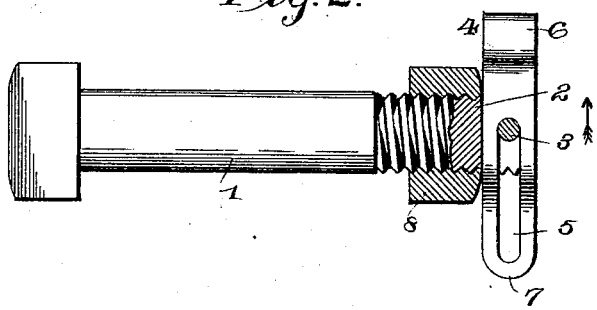
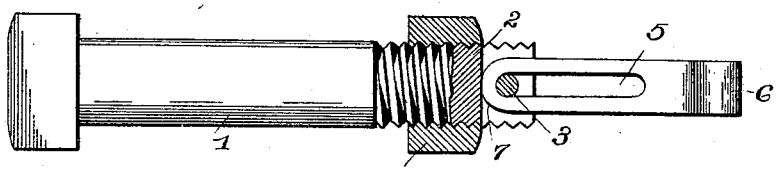
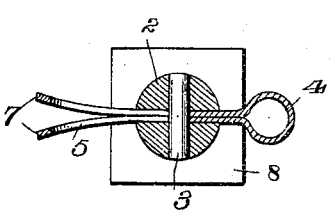
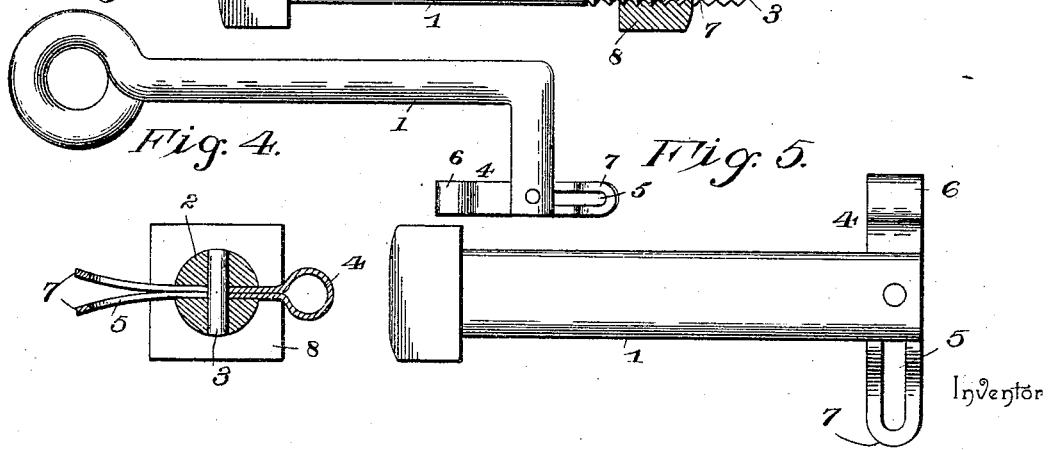
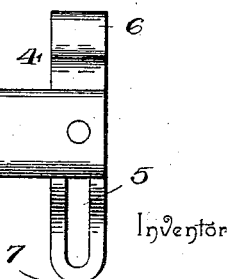
Witnesses
Chas A Ford
H. H. Riley
By his Attorneys
C. A. Snow & Co.
Inventor
Frank P. Johnson,
THE NATIONAL LITHOGRAPHING COMPANY,
WASHINGTON, D. C.

UNITED STATES PATENT OFFICE.

FRANK P. JOHNSON, OF DANVILLE, PENNSYLVANIA.

NUT AND BOLT LOCK.

SPECIFICATION forming part of Letters Patent No. 521,470, dated June 19, 1894.

Application filed February 17, 1894. Serial No. 500,566. (No model.)

*To all whom it may concern:*

Be it known that I, FRANK P. JOHNSON, a citizen of the United States, residing at Danville, in the county of Montour and State of Pennsylvania, have invented a new and useful Split Key for Locking Nuts and other Purposes, of which the following is a specification.

The invention relates to improvements in split keys.

The object of the present invention is to provide a simple and inexpensive split key, adapted to be readily applied to a bolt for locking the nut thereon, and capable of enabling the nut to be readily placed on or removed from the bolt when desired, and adapted to be retained permanently in connection with the bolt to prevent any liability of its becoming lost.

A further object of the invention is to enable a bolt or pin to be securely locked against accidental removal or displacement, and to be readily removed or detached when desired, and to permit a ring or loop, or similar coupling, to be detachably connected with a hook.

The invention consists in the construction and novel combination and arrangement of parts hereinafter fully described, illustrated in the accompanying drawings and pointed out in the claim hereto appended.

In the drawings—Figure 1 is a perspective view of a split key constructed in accordance with this invention, and shown applied as a nut lock. Fig. 2 is a longitudinal sectional view of the same, showing the position of the parts when locked. Fig. 3 is a similar view showing the parts arranged to permit the nut to be readily placed on or removed from the bolt. Fig. 4 is a transverse sectional view, the parts being locked. Fig. 5 is a side elevation of an unthreaded bolt or pin, showing the split key applied thereto. Fig. 6 is a similar view, illustrating the manner of applying the split key to the shank of a hook.

Like numerals of reference indicate corresponding parts in all the figures of the drawings.

1 designates the shank of a bolt, pin, hook, or the like, provided at one end with a head, and having its other end 2 bifurcated; and secured in the bifurcation by a transverse pin 3 is a split or spring key 4, provided at the outer ends of its sides with a longitudinal slot 5 receiving the transverse pin. The spring or split key 4 is preferably constructed of a single piece of resilient metal, which is doubled to form a loop or bend 6, and opposite sides; the outer ends 7 of the sides are rounded; and when the key is arranged transversely of the bolt, for the purpose of locking a nut 8, or securing the pin or hook, it is adapted to be drawn away from the shank in the direction of the arrow to bring the rounded ends of the sides in the bifurcation. The key may then be turned longitudinally of the shank or the adjacent portion thereof, to form an extension of the same to permit the nut to pass it readily, or to enable the pin to be withdrawn. This construction provides a positive and reliable nut lock, as the resiliency of the key is such that the outward springing of the sides will engage the bolt with sufficient friction to secure it firmly in its locking position transverely of the bolt. It will also be apparent that the split key may be readily arranged to form an extension of the shank of the bolt, to permit the nut to be placed on or removed therefrom, without injuring it in any manner, or impairing its future usefulness.

Fig. 5 of the drawings illustrates the manner of applying a split key to the shank of an unthreaded bolt or pin, to enable the same to be securely locked without a nut. This construction is applicable to various kinds of pins and the like where it is undesirable to use a nut.

In Fig. 6 of the accompanying drawings is illustrated a hook, and a split key is shown applied to the same. The key is adapted to securely lock a ring or other form of coupling to the shank of the hook, or to secure the hook in a perforation or the like.

Changes in the form, proportion and the minor details of construction may be resorted to without departing from the principle or sacrificing any of the advantages of this invention.

What I claim is—

The combination with a bifurcated shank, of a spring key constructed of a single piece of resilient metal, doubled to form the loop or bend 6 and having divergent sides arranged in the bifurcation of the shank, and provided with longitudinal slots, and a fastening device arranged in the slots of the sides and securing the key to the shank, said diverging sides frictionally engaging the shank and securing the key, substantially as described.

In testimony that I claim the foregoing as my own I have hereto affixed my signature in the presence of two witnesses.

FRANK P. JOHNSON.

Witnesses:
 ALEX. H. GRONE,
 ROBERT ADAMS.